Nov. 8, 1966 T. W. KIERANS ET AL 3,283,513
PROCESS OF MOUNTING ELONGATED MEMBERS IN DRILL HOLES
Filed Dec. 23, 1964
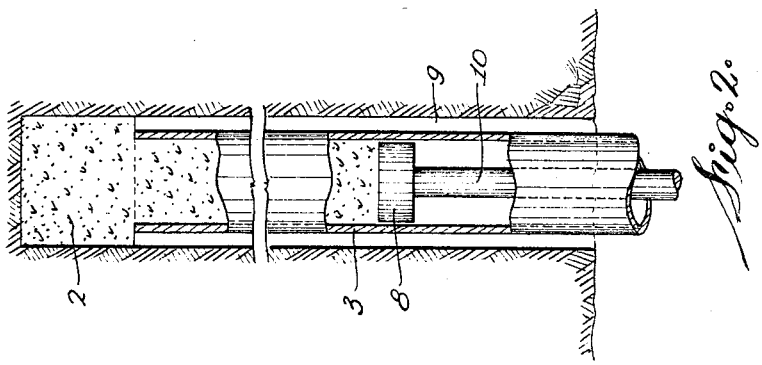
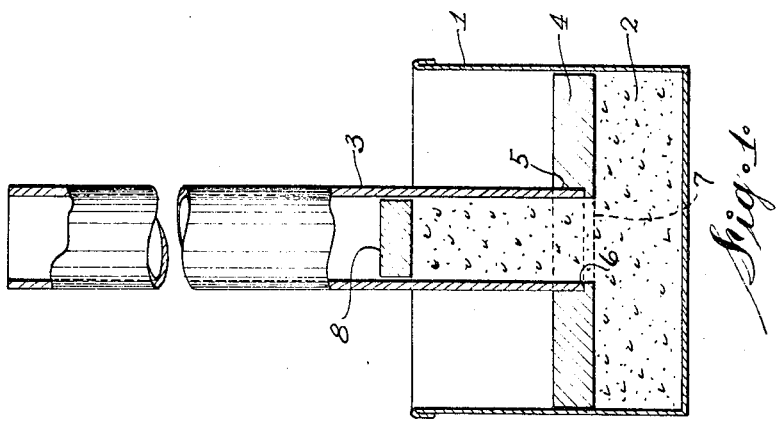
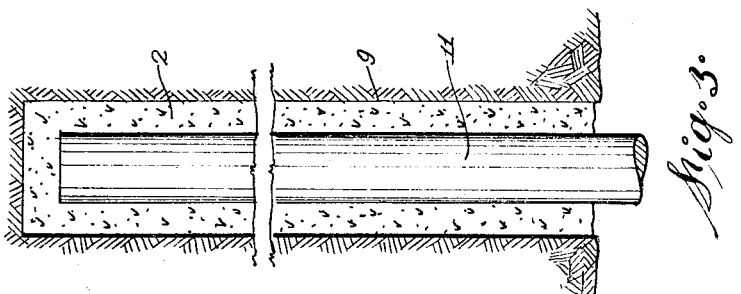
INVENTORS
Thomas W. Kierans
William J. Heard
BY
Harold C. Weir
PATENT AGENT

United States Patent Office 3,283,513
Patented Nov. 8, 1966

3,283,513
PROCESS OF MOUNTING ELONGATED MEMBERS IN DRILL HOLES
Thomas W. Kierans, P.O. Box 1089, Sudbury, Ontario, Canada, and William L. Heard, Milton, Ontario, Canada
Filed Dec. 23, 1964, Ser. No. 424,878
2 Claims. (Cl. 61—35)

This invention relates to a process of mounting elongated members in drill or bore holes. This application is a continuation-in-part of Serial Number 172,545, filed February 12, 1962, now abandoned.

The mounting of rockbolts in drill holes by means of a hardenable material which bonds the bolt to the wall of the hole is a frequently employed practice. However, the selection of a suitable hardenable material has presented a serious drawback in the past. The material, frequently concrete, has been considered to be of a necessarily flowable consistency and, particularly in the case of concrete, must possess this characteristic prior to setting. If the hole is horizontal or downwardly inclined, a serious problem is involved in that the material will not maintain its position in the hole and means must be provided to retain it in position in the hole. Furthermore, in using a flowable material, means must be provided to permit outlet of trapped air in the hole. Thus, the provision and application of the material frequently involves the use of equipment which, in some instances, is elaborate and costly, and which, in other cases, is inconvenient to use and subject to interference with the function of the material.

It is an object of this invention to provide a process for mounting elongated members in drill holes, which involves the use of a material of a settable, form-retaining character, which is convenient and effective in practice, which involves the use of simple, readily available equipment, and which results in a satisfactory structure.

The invention resides in a process of mounting elongated members in bore holes which comprises placing a body of unset material of plastic, settable, form-retaining character in an open-ended tube, inserting the material containing tube into a bore hole of larger diameter than that of the tube and with an open end of the tube in contact with the bottom wall of the hole, withdrawing the tube from the hole while applying pressure to the body of material to extrude it out of the tube and initially into contact with the bottom wall of the hole and then progressively and continuously into contact with the side wall of the hole beginning with its line of juncture with said bottom wall while gradually removing the tube from the hole to form a continuous form-retaining column of said body in the hole and in adherent relation with the walls of the hole, and thereafter, before setting of the body, inserting an elongated member into said body in the hole to partially displace the body and place it in contact with the surface of the elongated body, said body of material, on setting thereof, firmly anchoring the elongated member in the hole.

The invention will be described with reference to the accompanying drawing, in which FIGURES 1, 2 and 3 are sectional elevations illustrating steps in carrying out the process of the invention.

Referring to FIGURE 1, 1 is a cylindrical vessel adapted to receive a supply of the plastic, settable, form-retaining material. As previously indicated, one of the essential characteristics of this material is that, while it is of plastic, settable nature, it must substantially retain any shape (prior to setting) in which it is placed by external pressure. There are many materials which may be selected to fulfill these characteristics, but the following formulas are given by way of preferred examples.

*Formula No. 1*

10 lbs. epoxy resin sold under the trademark "Epon 828"
5 lbs. hardener, namely, 4 lbs. organic polysulphide rubber sold under the trademark "Thiokol LP3"
1 lb. dimethylaminophenol sold under the trade name Rohm & Haas DMP 30
3 lbs. asbestos fines as filler.

*Formula No. 2*

10 lbs. epoxy resin sold under the trade name Union Carbide ERL 2774
5 lbs. hardener, namely, 4 lbs. organic polysulphide rubber sold under the trademark "Thiokol LP3"
1 lb. dimethylaminophenol sold under the trade name Rohm & Haas DMP 30.
3 lbs. asbestos fines as filler.

*Formula No. 3*

10 lbs. epoxy resin "Epon 828" or "ERL 2774"
1 lb. diethylene triamine as hardener
1 lb. filler comprising ½ lb. of milled glass fibers and ½ lb. of colloidal silica as sold under the trademark "Cab-O-Sil."

*Formula No. 4*

10 lbs. epoxy resin "Epon 828" or "ERL 2774"
2½ lbs. hardener comprising a thermoplastic polymer sold under the trademark "Versamid 125"
4 lbs. bentonite as filler.

*Formula No. 5*

10 lbs. epoxy resin "Epon 828" or "ERL 2774"
2½ lbs. hardener comprising a thermoplastic polymer sold under the trademark "Versamid 125"
4 lbs. Portland cement as filler.

The ingredients of the selected material are placed in vessel 1 and thoroughly mixed together in conventional manner to desired consistency.

While the body of material 2 is in plastic condition a transfer tube 3 with a transfer piston 4 removably fitted thereon is inserted into the vessel 1 with the piston 4 in contact with the surface of the material. It will be observed that the piston 4 has a sliding fit in vessel 1 and that transfer tube 3 has a diameter substantially less than that of vessel 1. The outside diameter of tube 3 is slightly less than the diameter of the bore hole in which the rock bolt is to be mounted. The internal diameter of vessel 1 may be two, three or more times that of the internal diameter of the tube. It will be apparent that the purpose of cylindrical vessel 1 is to provide a mixing chamber for the material of convenient and adequate size and to render it possible to transfer the body of material from the vessel 1 to the transfer tube 3.

The piston 4 has a central or axial bore 5 provided with an annular shoulder 6 constituting a seat for the end edge of transfer tube 3. Thus, the bore constitutes a tube end receiving socket and a central opening 7 for flow of grout into the tube. The tube contains an imperforate piston 8 having a free sliding fit therein.

In conducting the material transfer step, downward pressure is applied to tube 3, which in turn, exerts pressure on the transfer piston 4. This pressure forces the material to flow upwardly through opening 7 into the tube 3. This flow of material will, of course, cause the transfer tube piston 8 to move along the tube in advance of the material. When the entire body of material is transferred to the tube 3, the latter with the contained material is removed from the vessel and piston 4. It will be apparent that the volume of the body of material employed will be the predetermined amount required for the particular operation involved.

Referring to FIGURE 2, the tube 3 and contained material is now inserted into the bore hole 9. It will be apparent that the body of material at one end of the tube will be exposed through the adjoining open end of the tube while the piston 8 will rest on the face of the body of material adjacent the other end of the tube. As shown in FIGURE 2, the exposed material face end of the tube is inserted first into the bore hole 9. The tube is inserted to the full depth of the hole, i.e., until its end edge is in contact with the bottom wall of the hole.

A ramrod 10 is now applied to transfer tube piston 8 and pressure exerted thereon to extrude the material into the hole by withdrawing the transfer tube over the ramrod until the tube is empty and all the material is in the bottom portion of the bore hole 9.

The ramrod and transfer tube are now removed from the hole.

Referring to FIGURE 3, a rockbolt 11 is now inserted into the bore hole which causes the body of material to be extruded from the bottom of the hole around the bolt whereby the portion of the bolt within the hole is completely surrounded by the body of material. It will be apparent that, by correctly calculating the volume of the body of material, such body will substantially completely fill the space in the hole between the walls thereof and the rockbolt.

On setting or hardening of the body of material, the rockbolt will be securely anchored in the hole. The bolt may be fitted with a collar washer plate and tensioned in conventional manner.

While the foregoing examples contemplate the use of an epoxy resin as the major ingredient of the settable form-retaining material, it will be understood that polyester resins, with suitable solvents, catalysts and promotors therefor as well as a filler, may be alternatively employed.

We claim:
1. Process of mounting an elongated member in a rock drill bore hole which comprises forming a hardening body of material consisting essentially of a resin selected from the group consisting of epoxy and polyester resins, a hardener for said resin, and a finely divided solid filler, mixing said body to a plastic, inherently form-retaining consistency, said body retaining said consistency for a limited period of time prior to hardening thereof, during said period of time placing said body in said bore hole by
    (a) inserting said body into an open-ended tube of less diameter than that of said bore hole,
    (b) inserting said body-containing tube into said bore hole and with an open end of said tube in contact with the bottom wall of said hole,
    (c) withdrawing said tube from said hole while applying pressure to said body to extrude it out of said tube and initially into contact with the bottom wall of said hole, and then progressively and continuously into contact with the side wall of said hole beginning with its line of juncture with said bottom wall while gradually withdrawing said tube from said hole, and
    (d) completely removing said tube from said hole when said body has been extruded therefrom, said body forming a column thereof in said hole in adherent, fixed relation with respect to the walls of said hole, inserting an elongated member into said column while still in said period of time in said hole to partially displace said column and place it in contact with the entire side and end surfaces of the portion of said elongated member disposed in said column, and thereafter permitting said body to harden and thereby anchor said elongated member in said hole.

2. Process of mounting an elongated member in a rock drill bore hole which comprises forming a hardening body of material consisting essentially of an epoxy resin, a hardener for said resin, and a finely divided solid filler in the proportion of 1 to 3 parts filler to 10 parts by weight of said resin, mixing said body to a plastic, inherently form-retaining consistency, said body retaining said consistency for a limited period of time prior to hardening thereof, during said period of time placing said body in said bore hole by
    (a) inserting said body into an open-ended tube of less diameter than that of said bore hole,
    (b) inserting said body-containing tube into said bore hole and with an open end of said tube in contact with the bottom wall of said hole,
    (c) withdrawing said tube from said hole while applying pressure to said body to extrude it out of said tube and initially into contact with the bottom wall of said hole, and then progressively and continuously into contact with the side wall of said hole beginning with its line of juncture with said bottom wall while gradually withdrawing said tube from said hole, and
    (d) completely removing said tube from said hole when said body has been extruded therefrom, said body forming a column thereof in said hole in adherent, fixed relation with respect to the walls of said hole, inserting an elongated member into said column while still in said period of time in said hole to partially displace said column and place it in contact with the entire side and end surfaces of the portion of said elongated member disposed in said column, and thereafter permitting said body to harden and thereby anchor said elongated member is said hole.

References Cited by the Examiner

UNITED STATES PATENTS

| | | | |
|---|---|---|---|
| 2,047,344 | 7/1936 | Watt | 61—53.62 |
| 2,376,698 | 5/1945 | Irvine et al. | 52—698 X |
| 2,930,199 | 3/1960 | Jarund | 61—45 |
| 2,952,129 | 9/1960 | Dempsey | 61—45 |
| 3,108,443 | 9/1963 | Schuermann et al. | 61—45 |
| 3,111,569 | 11/1963 | Rubenstein | 52—309 X |

FOREIGN PATENTS 918,086   9/1954   Germany.

OTHER REFERENCES

Progressive Architecture, August 1959, pages 138 thru 141.

EARL J. WITMER, *Primary Examiner.*